Sept. 8, 1942.       K. A. SCHMULDT       2,295,014
TOOL
Filed Dec. 27, 1940

INVENTOR
K. A. SCHMULDT
BY
E. R. Nowlan
ATTORNEY

Patented Sept. 8, 1942

2,295,014

UNITED STATES PATENT OFFICE 2,295,014

TOOL

Karl A. Schmuldt, Teaneck, N. J., assignor to Western Electric Company, Incorporated, New York, N. Y., a corporation of New York Application December 27, 1940, Serial No. 371,905

5 Claims. (Cl. 82—12)

This invention relates to tools, and more particularly to tool attachments for lathes.

With standard equipment for a metal working lathe, that is, without form cutters therefor, some of the most difficult results to accomplish are the forming of accurate concave and convex parts in work. Furthermore, the cost of producing but a small number of such parts would be high if a form cutter should be necessary.

An object of the invention is to provide a tool which is simple in structure and efficient in operation with interchangeable parts to cut concave and convex portions on rotating work.

With this and other objects in view, the invention comprises a yoke to selectively singly support elements carrying cutting members relative to rotatable work and moving means for the elements to cause cutting members singly carried thereby to form various concave and convex surface portions in the work.

Other objects and advantages will be apparent from the following detailed description when taken in conjunction with the accompanying drawing, wherein Fig. 1 is a side elevational view of the tool having a supporting element of one type therein;

Figure 1:
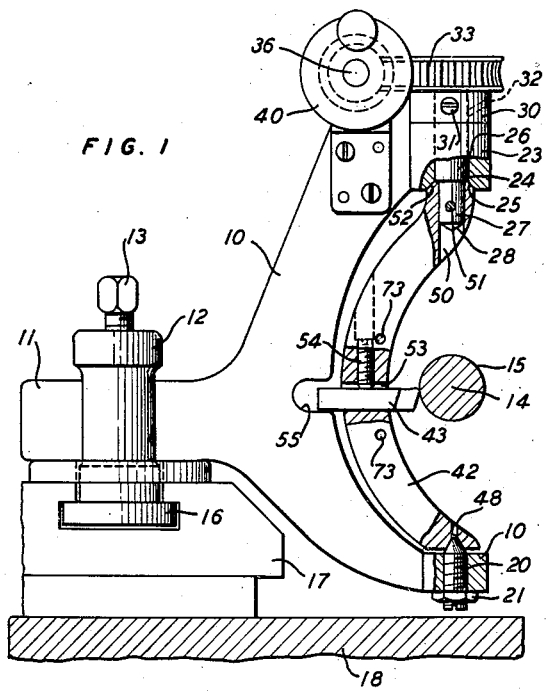
Figure 3:
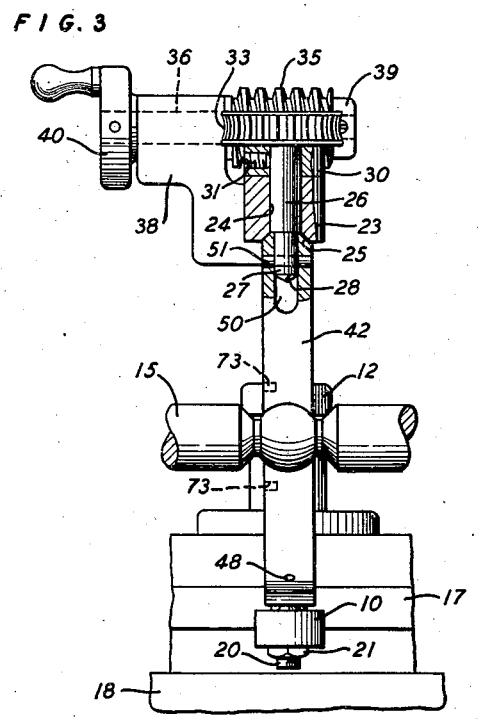
Fig. 3 is a rear elevational view of the tool as shown in Fig. 1, portions thereof being shown in section.
Figure 4:
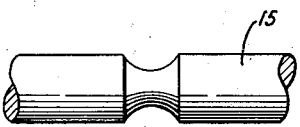
Fig. 4 is a fragmentary elevational view of a portion of material or work illustrating one result accomplished with the supporting element shown in Fig. 2.

Referring now to the drawing, particularly Figs. 1 and 3, the tool consists of a yoke 10 having an arm 11 receivable in a suitable support, which in the present illustration is a tool rest 12, a set screw 13 of the tool rest being positioned to engage the arm 11 and secure the yoke 10 in any desired position relative to a center 14 of rotatable work 15. The work 15 may be held between centers of a lathe or in a chuck thereof and rotated thereby in a counterclockwise direction. The tool rest 12 in the present illustration is adjustably mounted, as at 16, in a supporting unit 17 mounted upon the bed 18 of the lathe.

The lower portion of the yoke 10 has a threaded aperture therein for receiving a cone-pointed center screw 20 held in any desired adjusted position by a lock nut 21. The upper portion of the yoke 10 has an integral bearing portion 23 centrally apertured at 24 and a bevelled or truncated cone-shaped lower extremity 25 of the aperture 24. A shaft 26 is disposed in the aperture 24 of the bearing portion 23 and has a reduced portion 27 with a conical end 28. A collar 30 is disposed concentric with the shaft 26 near the upper end thereof and is secured to the shaft through the aid of a screw 31. The collar 30 rests upon the upper surface of the bearing portion 23 and has an aperture 32 therein by the aid of which the shaft may be lubricated. A worm gear 33 is fixedly mounted upon the upper end of the shaft 26 adjacent the collar 30 and interengages a worm 35, the latter being mounted upon a shaft 36. The shaft 36 is rotatably supported in a bearing bracket 38, the latter being rigidly mounted upon the yoke 10 as illustrated in Figs. 1 and 3. A collar 39 is mounted upon and fixed to one end of the shaft 36, while a hand wheel 40 is mounted upon and fixed to the other end thereof.

Figure 2:
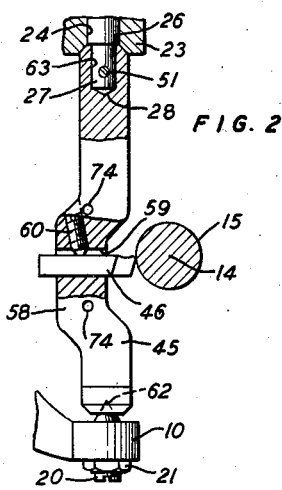
Fig. 2 is a fragmentary detailed view of the tool with the other type of supporting element therein.

In Figs. 1 and 3 a supporting element 42 of one type is shown positioned between the shaft 26 and the center 20 and supported thereby to position a cutting member 43 relative to the work 15 and move the cutting member to cut convex formations in the work, while in Fig. 2 another supporting element 45 is illustrated as being supported in the same manner by the shaft 26 and center 20 to support a cutting member 46 and move the cutting member relative to the work 15 to cut concave formations in the work.

Referring first to the supporting element 42, it will be noted that this element is substantially arcuate in general contour, the lower portion having an aperture 48 therein, the lower portion of which is conical in shape to receive the conical end of the center 20. In exact alignment with the aperture 48, an aperture 50 is formed in the upper portion of the element 42 to receive the portion 27 of the shaft 26, the element 42 being secured to the shaft 26 by suitable means such as a removable pin 51. The upper end of the supporting element is bevelled or of a truncated cone contour as at 52 receivable in the portion 25 of the aperture 24, the portion 25 serving as a bearing for the end of the element. Adjacent the central portion of the element 42, an aperture 53 is formed to receive the cutting member 43 which is secured at any desired position in the aperture through the aid of a set screw 54. At this point it will be observed that the yoke 10 is recessed, at 55, to allow for adjustment of the cutting member 43 and for movement of the cutting member therethrough.

Referring now to the supporting element 45 in Fig. 2, it will be observed that this element also has a substantially arcuate or offset portion 58, where an aperture 59 is provided to receive the cutting member 46, a set screw 60 holding the cutting member in any desired adjusted position relative to the work 15. The lower end of the element 45 has a conical recess 62 therein to receive the conical end of the center 20, while the upper end of the element is apertured, as at 63, to receive the portion 27 of the shaft 26, the removable pin 51 serving to removably secure the element 45 to the shaft 26.

Figure 5:
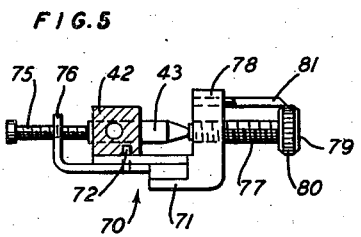
Fig. 5 is a top plan view of a locating unit for both supporting elements shown in Figs. 1 and 2 for locating cutting members therein.

In order that the tool with either the supporting element 42 and its cutting member 43 or the supporting element 45 and its cutting member 46 may be conditioned to form, respectively, convex and concave portions of definite sizes and with accurate dimensions in the work, a locating unit, indicated generally at 70 (Fig. 5) is provided to locate the cutting members in their respective supporting elements. The locating unit 70 consists of a body 71, of the contour illustrated in Fig. 5, which is substantially U-shaped, providing a central portion supporting pins 72 at positions spaced to be received in apertures 73 of the supporting element 42 or in the spaced apertures 74 of a supporting element 45. By the aid of the pins 72 the unit may be removably secured to and located in definite positions on either supporting element 42 or 45. It should be understood that these supporting elements may be moved to positions where the unit 70 may be attached without interference with or by the yoke 10. Let it be assumed, for example, that the unit 70 is attached to the supporting element 42. A moving member, such as a screw 75, carried by a leg 76 of the body 71, will be disposed in alignment with the cutting member 43 and positioned to engage the adjacent end thereof. While so located, a positioning or locating element in the form of a screw 77 is carried in a threaded aperture in a leg portion 78 of the body 71. The locating element 77 is in alignment with the cutting member 43 and positioned to engage the cutting point or edge thereof. A head portion 79 is formed on and made a part of the locating element 77, graduations 80 being formed at definite spaced positions about the head. Other indicating means may be provided for the graduations 80, so that accurate readings may be made of the graduations relative to a pointer 81 carried by the leg portion 78 to determine the exact location of the inner end of the locating element or the cutting edge of the cutting member relative to the center line of the shaft 26 and the center 20. In a similar manner the locating unit 70 may be mounted on the supporting element 45 to accurately locate the cutting edge of the cutting member 46 relative to the center lines of the shaft 26 and the center 20 when the support 45 is mounted in the yoke as illustrated in Fig. 2.

In the operation of the apparatus, the tool may be conditioned to cut concave or convex forms in the work 15 and may be adjusted to vary the concave and convex forms with an adjustment in the location of the cutting members or with variations in the size of the work. Consider first the illustrations in Figs. 1 and 2 with the supporting element 42. The cutting member 43 is located at a definite position through the aid of the locating unit 70 to form a concave portion in the work of a definite radius. The work may then be rotated and the cutting operation will begin. The operator may cause the cutting member to move in an arcuate path by rotating the hand wheel 40, causing rotation of the shaft 36, the worm 35, the worm gear 33, the shaft 26 and the supporting element 42, moving the cutting member arcuately to cut into the work to form a concave portion therein, for example, of the contour illustrated in Fig. 3. This contour may be varied by varying the oscillating movement with the supporting element and the cutting member relative to the work in either direction or in both directions from the starting position where the cutting member lies in a plane at right angles to the center line of the work. The movement of the cutting member with the supporting element to one side of this plane may be greater than the movement to the other side thereof and if desired, a complete ball structure may be formed completely separate from the work or remaining fixed at one side thereof.

It will be observed in this illustration, that the center line of the shaft 26 and the center 20 passes through the center line of the work 15. This position is necessary in forming truly spherical portions in the work. The tool may be moved at positions where the center lines previously mentioned do not intersect, such positions depending upon the dimensions of the concave portion to be formed in the work.

Picture now the substitution of the supporting element 45 with its cutting member 46 for the supporting element 42 and its cutting member 43. Assume now that a concave portion is to be cut into the work 15. By the aid of the locating unit 70, the cutting member 46 is located so that the cutting point or edge of the cutting member may be disposed a distance from the center line of the shaft 26 and the center 20 equal to the radius of a concave portion desired to be formed in the work. This may be determined readily through the aid of the member 46 which is adjusted in the leg portion 78 of the body 71 until the correct reading on the head 79 registers with the pointer 81. After this has been accomplished the member 75 is rotated to force the point of the cutting member into engagement with the adjacent end of the element 77, at which time the set screw 60 is forced inwardly to hold the cutting member in its located position. The yoke may then be located longitudinally of the work to position the cutting member 46 adjacent the portion thereof in which the concave cut is to be made, and the work may then be rotated in a clockwise direction. The support 45 may be oscillated, the term "oscillation" applying to the movement imparted to the portion supporting the cutting member, the same as with the supporting element 42 although both supporting elements are rotated about a definite center, such movement feeding the point of the cutting member 46 to the work. This operation may be performed through the rotation of the hand wheel 40 and its associated means to move the supporting element 45 until the complete cut is made in the work forming the concave portion therein. The arcuate or offset portions in each supporting element make possible the movement of their respective cutting members relative to the work without interference with the work.

It will, therefore, be understood that the tool is composed of certain parts all of which function to perform their definite purposes in forming concave or convex portions in rotating the work.

The supporting elements 42 and 45 are accurately and positively supported at spaced positions by members such as the shaft 26 and the center 20 which have common centers, so that the force necessary to move the elements to move their respective cutting members into the work will not vary their locations or cause an unbalancing by any strain on the elements which might vary the accurate locations and movements of the cutting members. In the present embodiment the supporting elements 42 and 45 are separate and interchangeable to perform their separate functions, yet they are each important in forming the complete tool. The cutting members 43 and 46 may be one and the same, the supporting elements functioning to impart movements thereto to perform the different results. The locating unit 70 is also shown as a separable part of each supporting element, but serves its important function in definitely locating the cutting members with respect to the center lines of the supports for each supporting element or with respect to the center line of the work. The accuracy of this unit is made definite by the definite locations of the apertures 73 and 74 of the supporting elements 42 and 45.

The embodiment of the invention herein disclosed is merely illustrative and may be modified and departed from in many ways without departing from the spirit and scope of the invention as pointed out in and limited solely by the appended claims.

What is claimed is:

1. A tool comprising a cutting member, an elongate element having apertured ends and an aperture to receive the cutting member interposed between the said ends, a yoke having spaced ends, means to support the yoke, aligned center members carried by the spaced yoke ends and receivable in the said apertured ends of the element to firmly support the element, for rotary movement, on both sides of the cutting member, and means to cause rotary movement of the element to cause the cutting member to make arcuate cuts in a rotatable work.

2. A tool comprising a cutting member, a plurality of elongate elements of different contours having apertured ends and apertures to singly receive and support the cutting member betwen the respective ends, a yoke having spaced ends, means to support the yoke, aligned center members carried by the spaced yoke ends and receivable in the said apertured ends of the elements singly to firmly hold the selected element, for rotary movement, on both sides of the cutting member, and means to cause rotary movement of the elements singly to cause the cutting member to cut different forms in a rotatable work.

3. A tool comprising a cutting member, an elongate element having apertured ends and an apertured to receive the cutting member interposed between the said ends, a yoke having spaced ends, means to support the yoke, a shaft rotatably supported by one of the yoke ends and receivable in one of the said apertured ends of the element, a center member carried by the other yoke end in axial alignment with the shaft and receivable in the other apertured end of the element to cooperate with the shaft to firmly support the element, for rotary movement, on both sides of the cutting member, and means operatively connected to the shaft to cause rotary movement of the element to cause the cutting member to make arcuate cuts in a rotatable work.

4. A tool comprising a cutting member, an elongate element having spaced apertured ends, one of which is of a truncated cone contour, and an aperture interposed between the said ends to receive the cutting member, a yoke having spaced apertured ends and a truncated cone-shaped recess concentric with the operture of one of the ends to interengage the similarly shaped end of the element, means to support the yoke, a shaft disposed in the apertures of the said interengaged end and secured to the element, a center member disposed in the opertures of the said other ends in axial alignment with the shaft to maintain engagement of the interengaged ends, and means operatively connected to the shaft to cause rotary movement of the element to cause the cutting member to make arcuate cuts in a rotatable work.

5. A tool comprising a cutting member, an elongate element having spaced ends, one of which is of a truncated cone contour, and formed to support the cutting member between the said ends, a yoke having spaced ends, one of which has a truncated cone-shaped recess for interengagement with the similarly shaped end of the element, means to support the yoke, a center member in central alignment with the said recess connecting the other ends of the element and the yoke for rotation of the former relative to the latter, and means to cause rotary movement of the element to cause the cutting member to make arcuate cuts in a rotatable work.

KARL A. SCHMULDT.